United States Patent [19]
Dahlberg et al.

[11] 3,838,648
[45] Oct. 1, 1974

[54] PERSONAL TRANSPORTATION SYSTEM

[75] Inventors: Arnold R. Dahlberg, Scottsdale; John P. Lekas, Phoenix, both of Ariz.

[73] Assignee: Dahlberg Industries, Inc., Scottsdale, Ariz.

[22] Filed: Oct. 24, 1973

[21] Appl. No.: 409,332

[52] U.S. Cl............. 104/139, 104/147 R, 104/140, 104/119, 191/29 R, 191/49
[51] Int. Cl............................................. B61f 13/00
[58] Field of Search........ 104/23 FS, 118, 119, 120, 104/121, 139, 140, 147 R; 105/26 R, 141, 144, 145; 191/23, 29, 30, 45, 48, 49

[56] References Cited
UNITED STATES PATENTS

| | | | |
|---|---|---|---|
| 1,541,281 | 6/1925 | Ricker | 104/119 |
| 2,542,236 | 2/1951 | Cox | 104/121 |
| 3,381,541 | 5/1968 | Thireau | 104/23 FS |
| 3,791,308 | 2/1974 | Hartz | 104/139 |

*Primary Examiner*—M. Henson Wood, Jr.
*Assistant Examiner*—D. W. Keen

[57] ABSTRACT

The disclosed system is based on a guideway track or "monorail" of deep channel or W configuration having an upraised carriage supporting rib or rail in the bottom of the channel with troughs or gutters on either side to collect water, dirt, etc. This track is cast in sections, straight or curved, and aligned sections are usually set into the ground with coping and flexible cover or closure means at the top, generally located at ground level. The carriage frame is supported on a vertical spine comprising a main upright plate which carries traction drive wheels on forks pivoted to the end of the plate. The plate also carries vertical axled side rollers contacting the guideway side walls to support the carriage laterally. An endless heavy Vee belt, driven by electric motor, drives the traction wheels and serves also as a cushion between them and the track rib insuring good traction even on steep slopes. The wheel-carrying forks are directionally controlled by feeler rollers which ride against the channel side walls to detect curves or switching points and, through control linkage, to "program" the direction of movement. Power is supplied through electric conductors built inside the closed channel and major control functions, such as switching, speed, spacing between successive vehicles, etc., are fed to conductors or bus bars within the guideway; preferably, only simple start, stop and turn controls are built into the carriages themselves, simplifying passenger control, subject to overall system control programmed into the channel-track. The vault-like channel structure of the guideway affords electrical safety and forms a conduit for supply of heated or cooled air, from supply plants along the line, to keep the track free of ice in winter and to keep passengers in carriages warm or cool as needed. Conditioned air is scooped from the guideway into the passenger compartment. Applications to golf courses, ski lifts and to various municipal or industrial complexes of moderately dense personal transport requirements are described.

19 Claims, 19 Drawing Figures

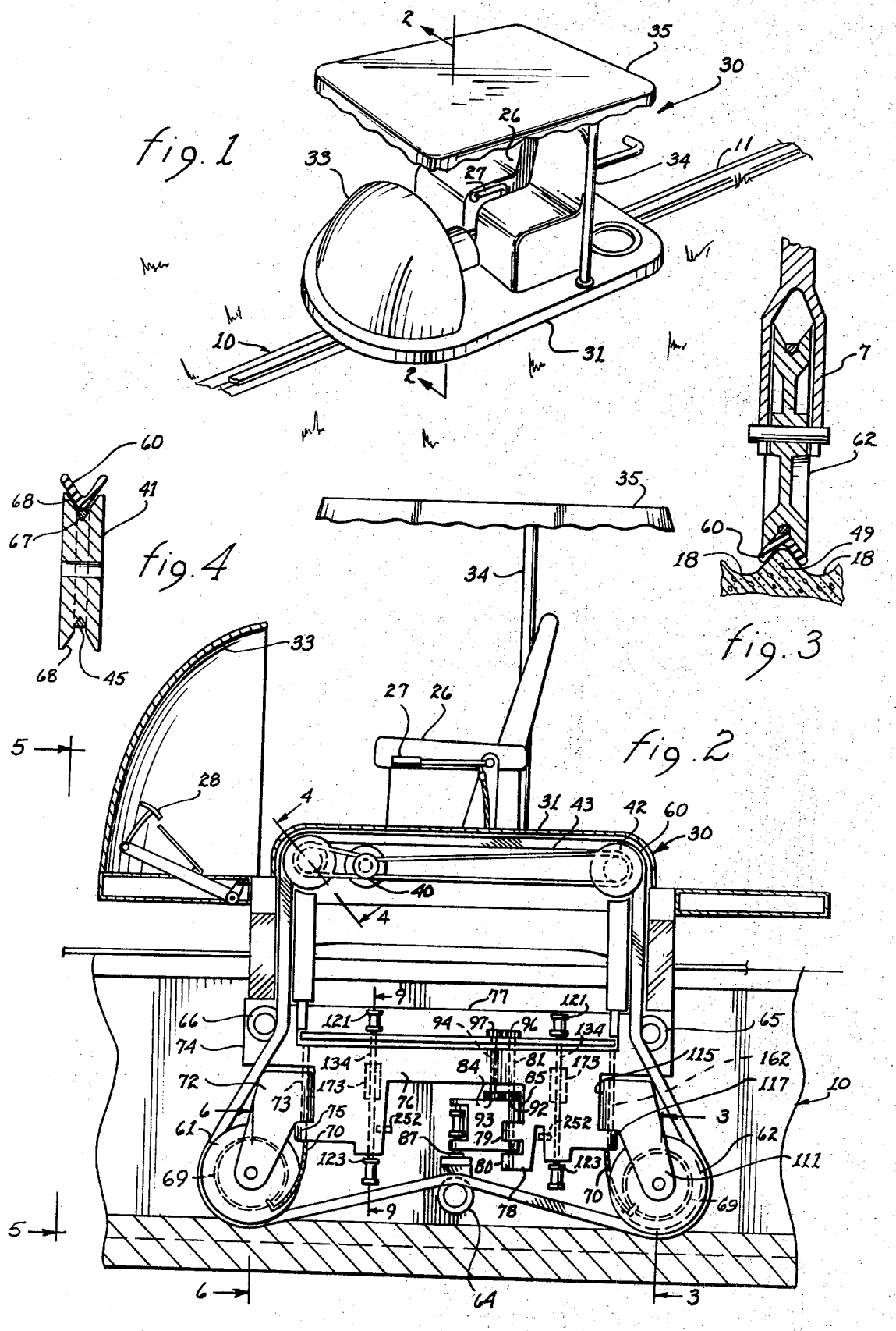

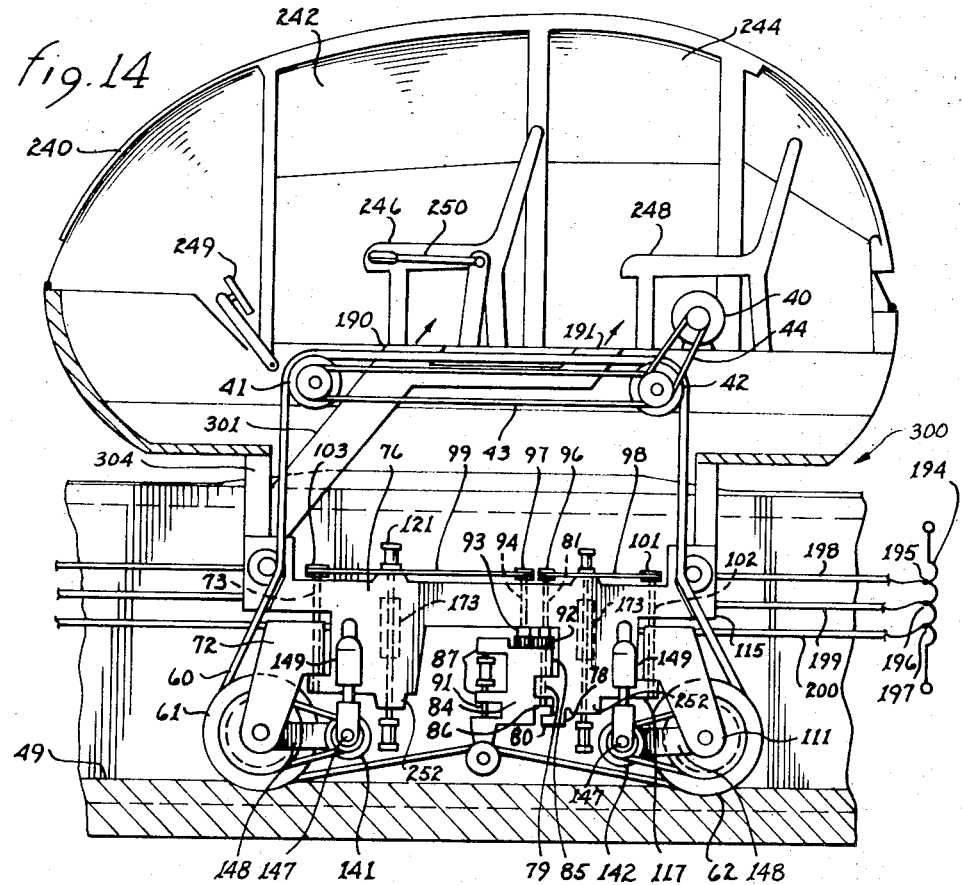
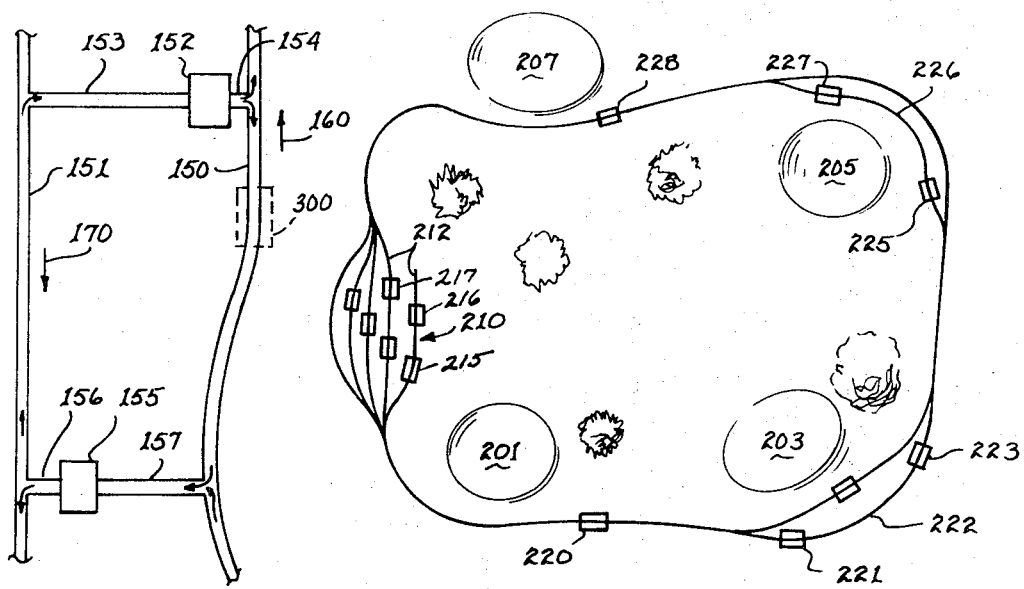

PERSONAL TRANSPORTATION SYSTEM

BACKGROUND AND PRIOR ART

The automobile, in general transportation, and its smaller counterparts, such as golf carts, scooters, etc., have largely replaced other forms of transportation in many situations but too often unfavorable conditions have been created. In many cities, mass transportation systems have been abandoned entirely or are in serious financial difficulty because they have disadvantages and popular or financial support has been taken away by the automobile. Around golf courses, particularly those more heavily patronized, the ever increasing use of golf carts, electric or gasoline driven, causes damage to turf and greens, destroying other vegetation or making it necessary to construct paved paths across the courses, which mar the scenery and detract from natural beauty. Many urban areas are encountering serious air pollution from automobiles, creating demands for transportation systems which retain, as far as possible, the major advantages of the automobile while avoiding the most serious of its faults.

Automobiles and their variants have succeeded well largely because they provide a personal type of transportation at moderate cost. Each driver can go quickly, conveniently and directly when he chooses from any point of origin to any desired destination without having to go to public stations. await public conveyance schedules, struggle through transfer points, and travel in discomfort. Buses transport larger groups of people having much the same pollution problems as automobiles, without the advantages of passenger privacy, convenience or comfort. For highly dense urban systems, mass vehicles or special guideways such as railroad trains and subway systems will doubtless have to be continued for the present. However, alternatives for these are needed especially where the traffic is somewhat less dense. With all their advantages, automobiles foul the air and waste costly fuel which is becoming constantly scarcer. Aside from large investment costs, they require enormous amounts of space for safe travel on highways and for parking or storage. These costs increase constantly. In bad weather they are of only limited utility and, under some conditions, are actually dangerous. Incompetent drivers add to their hazards; increasing population and concentrations of population require either that more and more of them be accommodated at vastly accelerating total costs or that some better way be provided for transporting a substantial part of the public locally. An object of the present invention is to make available a system which, in many situations, can replace the automobile, the golf cart, the ski-lift, airport transfer means or other small-load vehicle systems, while retaining as many of their advantages as possible. A particular application to golf courses will be described in some detail but the invention obviously has many other uses.

In recent years a number of specific proposals have been made, including so-called "Personal Rapid Transit" systems for cities or universities, a "Cabtrack" system for use in London, a system employing small four-passenger vehicles under computer control, following each other closely on urban highways, being diverted electronically to various destinations, etc. In Morgantown, W.Va., a demonstration study has been made and work initiated under approval of the U.S. Department of Transportation to build a system adapted to the combined needs of a typical small city and a major university. The system proposed will use a "guideway" consisting of 3.2 miles of elevated track with dual facilities for mono-directional travel in both directions. The system will have six stations, travel at a speed of 30 miles per hour and has a peak capacity design of 1,100 people every 20 minutes. Small coaches will be dispatched automatically to any station where passengers are waiting; those going to a common destination are sent on their way, by-passing intermediate stops; empty cars are sent on call rapidly to places where they are needed. The cost of this system, overall, is estimated to be about $2,000 per lineal foot of track. Obviously, such an expensive system cannot be built at all in many communities and is not suitable for many others. ("Personal Rapid Transit," J. E. Anderson, et al, University of Minnesota, 1972, pp. 141–147 and 405–410). In the same text, other systems are discussed, each having many limitations.

Overhead monorail systems have been widely advocated for use in "people movers" and in West Germany, at Wuppertal, a rather massive monorail system has been in use for many years, with moderate success. Construction costs are high; the conventional monorail system has more or less the same disadvantages that rail systems have, of requiring passengers to provide other transportation to and from the rather widely separated stations where they are picked up and discharged, vehicles are overloaded in rush hours, travel is usually uncomfortable and without privacy, etc. In general, the heavy mass transport systems of the prior art are being rejected by the public in varying degrees because they are very expensive to build and require long construction times, they require large and expensive rights of way and heavy duty guideways that are generally unattractive and often damaging to neighborhoods, and they must travel at high speeds and consequently cannot stop often, necessitating long spacing between stations. Such lines cannot be build economically in any community. In cities they are not where they are needed most and are correspondingly inconvenient. As one observer has noted, the success of the automobile indicates that a good system should adopt as many as possible of its best features and then proceed to replace it with one which will reduce its noise and air pollution, its costly requirements for operating and storage space, bringing the transport system as nearly as possible to the rider and taking him as directly as possible to his destination without stopping at way stations for others or being pushed around by crowds at transfer points. To solve these problems, at least for a number of applications, is a further object of the present invention.

More specifically, less massive and much less expensive systems can be used where traffic is lighter, as around golf courses, in parks, on ski-lifts, at shopping centers, airports, large industrial plants, and in other complexes smaller than the large urban communities. One feature of the present invention, which lends itself to such uses, is its basic relatively very inexpensive channel track or guideway of concrete, designed for light loads on relatively very small and lightweight carriages. The trackway is scarcely visible and does not mar the scenery; stops at sidings are facilitated by diverting those vehicles which are to stop in a particular station off the main track so that others need not be detained there, using a mono-directional line to avoid head-on collisions, and incorporating as many of the controls as possible into the guideway, leaving only minimal drive control functions to the passenger. By this means, according to the present invention, operating personnel are kept to a minimum while safety of the passenger is maximized.

The use of a guideway of channel cross section has been suggested by the sponsors of a project at the Aerospace Corporation (Anderson, op. cit., pp. 361–382) but this guideway is elevated above the ground, much like the guideways in the Morgantown project mentioned above. Such expensive construction is out of the question for less dense systems, particularly for golf courses and analogous applications, and a particular object of the present invention is to use primarily a ground level guideway (preferably submerged to about its full channel depth) so that the guideway blends with the ground surface and is almost invisible. Topped by a self-closing cover, the guideway channel houses its own electric power supply and can also facilitate heating or cooling of the passenger vehicles. Where weather conditions require supply of heat, or cooling, for reasonable passenger comfort, conventional equipment involves supply of power to the individual carriages, and heating or refrigeration equipment is installed in the individual carriages to draw individually on such power; necessary controls for temperature and ventilation must also be installed in each vehicle. A further object of the present invention is to supply these heating or cooling media, when they are needed, from one or more major external sources, e.g., by "piping" hot or cold air along the guideway channel itself which houses the track and the power lines, merely tapping or "scooping" the treated air from this conduit at each carriage and mixing with ambient exterior air, if needed, to meet requirements of the passengers. Costs overall are thereby greatly reduced.

Typical prior art systems drawing power from an electric line, which may be overhead or beneath the vehicle, often require complex controls in each carriage, thus greatly increasing the cost of each individual carriage unit. An object of the present invention is to build most of the control components in the track conduit itself. This minimizes carriage costs, leaving to the carriage operator only minimal control functions such as starting, stopping, turning, and in suitable cases a limited degree of speed control. This is accomplished by providing bus bar or electric line arrangements safely concealed in the conduit and supplied by power tapped off simple transformer equipment, to feed such power to selective brushes on the carriage in an appropriate way to control the maximum speed, velocity around curves consistent with banking, and related variables which are needed for passenger comfort and safety.

Instead of resorting to expensive steel work for rail or guideway construction, use is made of ordinary concrete to form the support rail itself, as well as the channeled housing or conduit which encloses the power lines and affords passageway for heated or cooled air, etc. A system for casting the track on this job in sections, with high precision matching ends for jointing, provides smooth and comfortable travel without complex resilient carriage suspension. The particular means by which such casting is accomplished forms no part of the present application but the resulting track structure is an important feature. Coping means on top which serve to narrow the channel opening, or to close it partially, are made adjustable and readily removable to provide full access to the track or to the electric power system. Normally, the electric system is enclosed in such a manner as to comply with electric codes requiring "vault" protection. The coping members are supplemented by an elastic flap closure, in the form of a sheet of reinforced rubber or other suitable plastic membrane, strong and thick enough to support ordinary cross traffic as it bridges over the opening between the coping elements. This closure excludes rain, snow, leaves and other debris. It opens as the carriage comes along, to provide access to the power lines and to allow basic carriage support on the rib or rail at the bottom of the conduit. As the carriage passes on, the closure comes back into closed position. On a golf course, this cover will exclude golf balls and will support pedestrians who step on the track. The whole track normally is set into the ground so that the closure flap or membrane is substantially flush with the top of the ground. Such an installation is substantially invisible. In some cases, the guideway may protrude moderately above the ground, to better exclude surface water, for example.

Preferably, the system operates monodirectionally; that is, any given guideway is in the form of a closed loop around a travel circuit; a pair of opposite way tracks may be installed alongside each other. This minimizes hazards of operation; there are no head-on collisions. By appropriate controls set into the guideway vault, speed at congested points can be limited automatically, as around curves, at cross-overs, and at any other point where rear end or transverse collisions might possibly occur because of passenger-driver negligence.

In the prior art, rubber tired vehicles and/or spring-supported suspension systems have been considered essential in practically all forms of transportation of the general type to which this invention pertains. A special object of the present invention is to design a carriage system which usually requires no rubber tires or spring suspension at all, or only a very minimal spring suspension. By use of a special heavy elastic Vee belt which directly contacts and rides on the rib, which is the essential "monorail," good tractive effort is secured with adequate absorption of the minor vertical vibrations encountered. Effective control of carriage movement around curves as well as straightway travel is maintained by a built-in mechanical "computer," at minimal cost of equipment. The tractive belt is guided and flexed laterally to follow around curves or to diverge at switches, with computer-like accuracy of movement, essentially eliminating all lateral acceleration imparted to the carriage or the passengers. This reduction of side acceleration contributes very greatly to riding comfort.

Other features of merit involve versatility of design; the carriage may carry two, four or any other small number of passengers in a very lightweight structure and with open air comfort, or may be made larger and/or enclosed for inclement weather; it may be equipped front and back with shock-absorbing bumpers if desired to minimize shock from rear end collisions, these may be excluded by control circuitry design in the power system; more complex and sophisticated control, by computer, etc., may be installed, if desired. The system prefereably is built to be operable and sufficient for most needs with a minimum of control equipment installed in each carriage. The invention contemplates switching means in the guideway and in each carriage for diverting any carriage to a side track or into station facilities or onto other lines. The basic switching or directing media are set into the channel vault system. An optional feature, for golf course installations especially, is a selectively controlled automatic tee positioner ("ATP") by means of which the golfer can dismount and push a button and the carriage will proceed by itself to the next tee position, ready to pick him up later. This avoids backtracking and/or carriage congestion at a particular golf green.

In order to keep the track design simple and still accommodate the necessary switching, cross-over and analogous operations, where supporting track structures diverge, there are provided transfer and lift means on the carriage and removable ramps which fit in bottom track structures at switching points. Because of need (1) to keep the ride smooth over what normally would be gaps in the ride rail, as is usual in conventional railway systems, and (2) to eliminate sliding parts in the rail itself, these unique switching means are designed to first lift the carriage off the rail then shift it laterally to a new rail. Vertical movements of the carriage are of a very gradual and smooth nature due to ramp design, as described more specifically hereinafter. By use of concrete as the basic structural material for the guideway, and by limiting unit track stresses to those which concrete can accommodate without damage, many of the complexities of rail operations in conventional systems are either avoided completely or are minimized.

On the carriage, and other parts, laterally acting guide rollers and contacts are mounted to swing into line with the supporting frame, i.e., the vertical support plate structure mentioned above. The whole carriage may then be lifted out of the conduit without removing or disturbing the coping. This facilitates carriage drive, inspection and repair when such are required. Other features, alternatives and variations and means for their accomplishment, will be set forth in the detailed description which follows.

BRIEF DESCRIPTION OF THE DRAWINGS

FIG. 1 is a small scale perspective view of an open air vehicle on a segment of track of a preferred system embodiment.

FIG. 2 is a sectional view on a larger scale, showing the track and the drive mechanism of the system of FIG. 1, this view being taken substantially along the line 2—2 of FIG. 1.

FIG. 3 is an enlarged sectional detail of a traction drive wheel and part of the traction belt on the rib or rail element of the guideway, taken along line 3—3 of FIG. 2.

FIG. 4 is a sectional view of a belt drive pulley and associated parts, taken along line 4—4 of FIG. 2.

FIG. 14 is a longitudinal section through a carriage and supporting framework arrangement adapted to receive hot or cooled air from the guideway conduit.

FIG. 15 is a small scale plan view of a system modified to provide heating or cooling to the vehicles on the guideway.

FIG. 16 is a small scale plan of a system provided with station and sidings, as set up in a park or on a golf course.

DESCRIPTION OF PREFERRED EMBODIMENT

Referring first to FIGS. 1 and 2, there is shown at 11 the exposed surface only of a guideway 10 which is set into the ground to approximately ground level. This is the preferred arrangement, since the guideway is nearly invisible, except at close range, but other arrangements may be made. In some cases it may be desirable to have the guideway to project slightly above ground to keep our rain or surface water.

Figure 5:
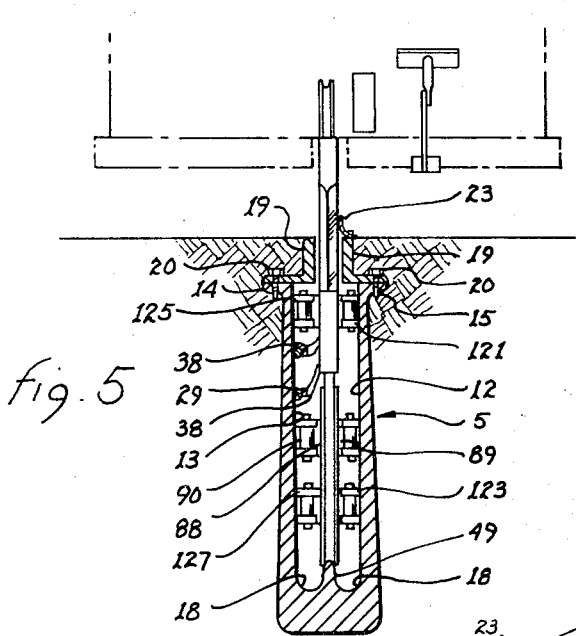
FIG. 5 is a transverse sectional view through the guideway and through parts of a carriage supported thereon.
Figure 6:
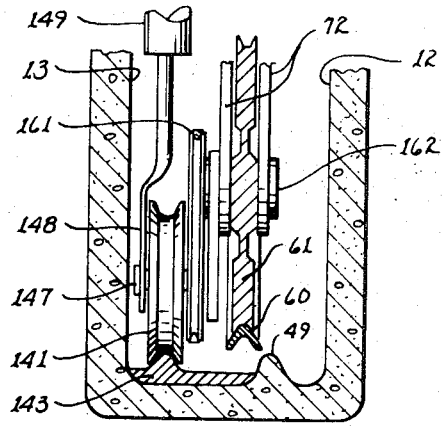
FIG. 6 is an enlarged fragmentary sectional view somewhat similar to part of FIG. 5 but taken at a switching point and showing part of the lift or transfer mechanism.
Figure 7:
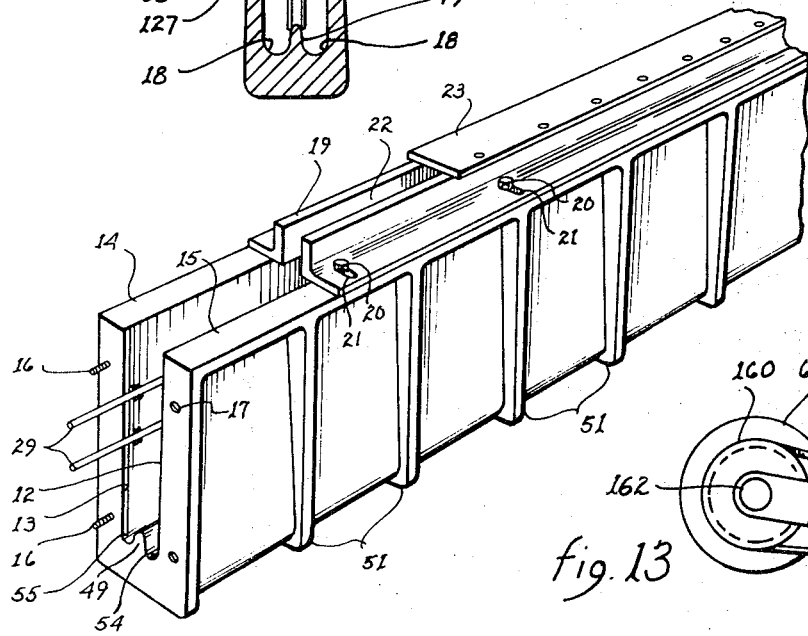
FIG. 7 is a perspective view of a section of guideway, showing the coping and cover flap for enclosing the conduit.
Figure 11C:
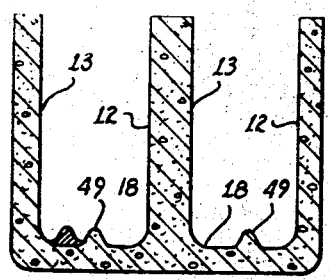
FIGS. 11a, 11b and 11c are diagrammatic sectional views of successive track or guideway portions taken respectively at lines 11a, 11b and 11c, FIG. 8.
Figure 11B:
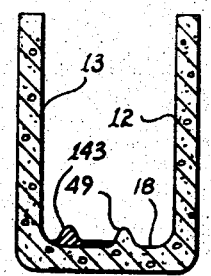
Figure 11A:
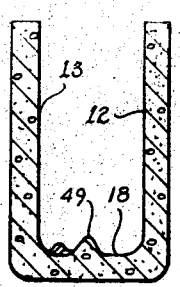

As best shown in FIGS. 5 and 7, with modifications in FIGS. 6 and 11, the guideway 10 is channel-shaped, or more accurately, is shaped throughout most of its length like a deep letter W, in cross section, having upright or approximately upright sidewalls 12 and 13, spaced apart far enough to accommodate carriage supporting, driving and steering mechanism, and the bottom of the channel normally has an upraised rib or monorail element 49 which directly supports the carriage structure through means described more fully below. The upper edges of the channel sidewalls, shown at 14, 15 are flat and flanged to give lateral strength, the preferred structure being of monolithic concrete sections, precast and reinforced where necessary or desirable. These sections ar provided with pins 16 or holes 17 at the ends, FIG. 7, where they join to insure good alignment at each joint; this of course helps the carriage to travel smoothly with minimum cushioning or spring suspension. The means by which the concrete sections are formed is not part of the present invention, but the guideway structure which results is an important aspect of this invention. Reinforcing ribs 51 are cast at intervals on each section to strengthen the guideway structure.

At its bottom, the channel 10 includes a trough or gutter 18, on either side of the raised rib or monorail element 49. Water runs into these gutters, leaving the rib high and dry. At appropriate intervals, i.e., at low points in the system, drainage connections, not shown, take accumulated water out of the guideway so that the track member 49 remains relatively above water. Small accumulations of dirt and other foreign matter in the gutters can be tolerated; excessive accumulations may be removed from time to time if necessary. Preferably, however, the guideway is closed at the top to exclude water and other foreign matter. Thus, it constitutes a vault in which electrical conduits for power can be installed in conformity with safety and fire codes. Coping members 19 on either side of the guideway are fastened by bolts 20 to the top flanges 15 and 14; preferably the coping members are formed of concrete and are slotted as shown at 21 so that they can be adjusted towards or from each other. In this way, the width of the gap between the copings can be set as desired. For convenience, certain guide roller mountings and other parts, described below, may be folded into line with a thin or narrow support structure so that the whole carriage may be lifted out of the channel and off the guideway without disturbing the coping members. In some cases, it may be preferable to remove the coping for a short section for lifting out, repairing or replacing the carriage. The gap 22 between the coping members 19 is normally narrower than that between walls 12 and 13 but still it is too wide to be left open for entrance of rain water, grass, leaves, and other foreign matter. A cover flap 23, FIG. 7, is attached to one of the coping members, which can be " plowed" out of the way as the carriage comes along and fall or flip back into closing position after the carriage passes by. This is used to close the gap. This flap may be made of stiffly reinforced rubber or other weather resistant material, preferably resilient, so that it will spring back into channel-closing position, after the carriage has passed. It should be heavy or stiff enough to keep small articles or matter normally present from getting into the guideway and preferably is rigid enough that people can walk on or over it without pushing it into or falling into the gap. If desired, two flap members may be used, one secured to each coping 19, the two being "zippered" or otherwise attached together so that they can be opened to permit the carriage to pass by and close again after it has gone by. Normally, this is not necessary. It is preferred, however, that the conduit or channel be quite completely closed, i.e. reasonably airtight, not only to keep out water and other foreign matter, but also in order that the channel may be used to safely house the electrical power lines and, further, so that the closed circuit can be used, if needed, to supply conditioned air to the carriage, e.g., warm air in winter or cooled air in summer.

A carriage 30 is shown which may be either a very light open air structure large enough to support two people, as in FIG. 1, or may be larger, to hold four or more people and enclosed for heating or cooling, as in FIG. 14. It comprises a platform 31 supported on framework to be described further below, a dashboard 33, upright post members 34 which support a roof or canopy 35 and a pair of seats 26. A pair of inline traction wheels, described below, are provided with braking means; a hand brake 27 is provided so that either passenger may operate it to stop the vehicle immediately in emergency. A foot pedal 28, connected through variable resistor or other speed control means, determines travel speed by controlling the flow of power from electric lines 29, inside the guideway, through contactors or brushes 38 to a drive motor 40. See FIG. 5. As shown in FIG. 2, motor 40 drives a pair of belt pulleys 41 and 42 through drive belts 43, 45. These pulleys, in turn, drive traction means described below to propel the carriage. In other embodiments, as in FIG. 14, motor 40 is under the carriage seat and belt 44 is used to drive the pulley 42. In this case only one of the pulleys is directly motor driven.

An important feature is a heavy endless resilient Vee belt 60 which passes around the traction wheels 61 and 62 as well as around the drive pulleys 41 and 42. See also, FIG. 3. This heavy belt, of elastic material, serves as a cushion between the traction drive wheels and the track rib or monorail 49, serving also to improve the frictional drive between the carriage and the track. Supplementary pulleys 64, 65 and 66 which ride in the V-shaped groove formed in the outer surface of the belt, guide it in its path. At least one of these may be adjustable to take up slack in the traction belt 60. Tests show that this belt gives sufficient springing to the carriage that it rides satisfactorily without any conventional spring suspension, greatly simplifying the carriage structure. Care is taken that the guideway sections are cast with precision and joined together precisely; pins 16 and holes 17 help. There are no substantial vertical vibrations given to the carriage at the section joints and the cushioning effect of the traction belt 60 is usually sufficient for a comfortable ride. If desired, however, a spring suspension may be built into the carriage.

As best shown in FIG 4, the drive pulleys 41 and 42, which are alike, are each provided with a narrower V-groove 67 inside the main V-groove 68. The inner groove accommodates the motor drive belt 45, the larger traction belt 60 running outside in the larger groove 68. With this arrangement, traction between the motor drive belt 45 and the heavy traction belt 60 is improved and the drive is more positive, although some minor slipping may occur to take up shock in an emergency, as in case of collision with a vehicle ahead or a sharp setting of the brakes. As best shown in FIG 2, drum type brakes 69 are provided on each of the traction wheels 61 and 62, operated by Bowden cables 70 from the emergency hand brake lever 27 or optionally from a foot pedal.

The front wheel 61 is mounted in a pivoted wing piece or fork 72 secured to a vertical shaft 73 mounted rotatably in ears 74 and 75 of a main center support or vertical frame member 76 in the form of a heavy vertical plate to which the carriage 30 is attached. This plate 76 constitutes the main spine or supporting framework for the carriage. Other carriage parts of obvious types. Frame member 76 also supports a number of vital parts for controlling carriage movement which will next be described.

Somewhat to the rear of its center, the member 76 has a depending arm 78 which has two forwardly extending ears 79 and 80. A vertical controller shaft 81 is journalled in these ears and in member 76; see also FIG. 14. This shaft 81 is fastened non-rotatably to a rudder or pilot plate 84 through its ears 85 and 86. Through other forwardly extending ears 87, plate 84 supports a pair of wall sensor members in the form of double rollers 89 and 90, FIG. 5, on shaft 91, FIG. 14. These are set to ride along intermediate parts of the vertical side walls 12 and 13 of guideway 10 and to sense directional changes in the guideway. Where the guideway section is straight, there is no pivotal movement of member 84 with respect to plate 76. Where the guideway is curved, the pilot member 84 will be swung to the right or to the left with respect to main support 76, according to motion imparted to the feeler rollers 89 and 90. As shown in FIG. 14, which is identical with FIG. 2 so far as these parts are concerned, shaft 81 has a gear 92 fixed to it above ear 85, which meshes with a gear 93 of the same diameter fixed on a parallel shaft 94. Shafts 81 and 94 thus will turn to the same extent, but in opposite directions, when the wall sensors move plate 84 as they detect curvature in the side walls of the guideway.

At its top end the shaft 81 has fixed a chain sprocket 96 and the parallel shaft 94 also has a sprocket 97 fixed at its top end. A chain 98 is connected from sprocket 96 to a sprocket 101 on a shaft 102 at the right, FIG. 14. Similarly, a chain 99 passes from sprocket 97 around a sprocket 103 fixed to the top of shaft 73 to which the piece 72 already described is fixed, this shaft being rotatable in ears 74 and 75 but fixed in the piece 72. Hence, as shaft 81 is rotated under impulse from the wall sensors 89 and 90, the piece 72 which carries the forward traction wheel 61 will be rotated in the opposite direction through gears 92, 93, shaft 94, sprockets 97, 103 and chain 99 and the traction belt 60 at the front wheel will be flexed laterally to follow the curvature in the guideway, i.e., to follow the rail rib 49 or a counterpart of that rib if the carriage is momentarily lifted off the rib, as at a switching point or a cross over. This will be explained further below.

Similarly, the rear traction wheel 62 is mounted in a pivoted fork piece 111 secured to upright shaft 102. Shaft 102 is pivotally mounted in ears 115 and 117 extending rearwardly from plate 76. Through chain sprocket 101 fixed to its top end, and through sprocket 96 on the upper end of shaft 81, the shaft 102 is turned whenever rudder shaft 81 rotates, and to the same angular extent and in the same direction. That is, looking down on the guideway, FIG. 8, when the track curves to the left, the sensor rollers 89 and 90 swing to the right relative to the vertical plate or frame member 76, rotating the shaft 81 clockwise. Meanwhile, through gears 92, 93, etc., shaft 94 turns shaft 73 and the front wheel 61 and associated parts counterclockwise. The traction belt 60 is flexed to the left along with wheel 61 to follow the rib or track 49. Rear wheel 62 of course is swung in the opposite sense, that is, clockwise, flexing the belt 60 at this point to the right. By measuring the curvature in the track as they sense the side walls 12 and 13, the sensors 89 and 90 and associated parts just described "compute" the curvature and set the wheels 61 and 62 appropriately.

An important aspect is the switching mechanism, designed to minimize bumps at switching points and cross-overs. The lateral rollers 121, 125, etc., which contact the side walls of the guideway maintain lateral stability and if the guideway is formed with accuracy, there are no objectionable side jolts. The guideway may be appropriately banked for curves, as will be obvious but vertical support which is provided, in general, by the rail 49 must be given special consideration at switching points. The belt 60 cushions minor vibrations but is not sufficient to take care of crossings. Rather than use conventional frogs, which must be cut out for flanges to cross, means are provided for gently lifting the carriage over the rail 49 onto the new section when the carriage is diverted onto a side track.

The means just mentioned include a gently rising removable ramp 143 inserted beside the central track element 49 at each switching point, together with a carriage-mounted wheel 141 beside each wheel 61 or 62 which can be lowered into position, as the ramp is approached, to take the carriage weight off track 49, transferring to the ramp. The ramp-riding wheel 141 is positively driven by a belt 161 from wheel 61 or 62, or from its shaft, so as to maintain positive traction while the carriage is lifted above the track 49 high enough for the side flanges of belt 60 to clear the track for transfer laterally to a new track section.

Figure 8:
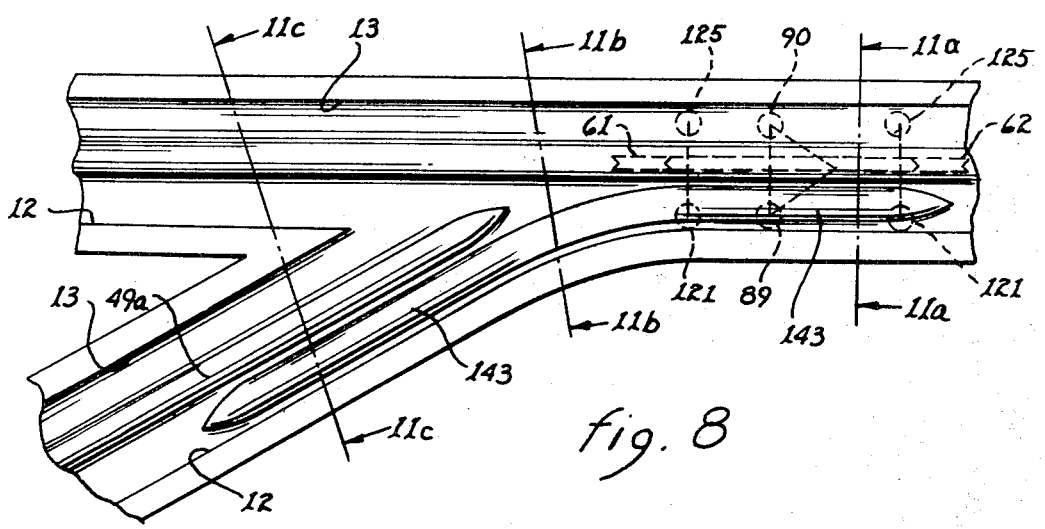
FIG. 8 is a top view of a guideway at a switching point showing the directing or ramp means by which the carriage may be shifted onto a side track.

As shown in FIG. 8, looking towards the left, ramp 143 starting with zero height is placed in a gutter 18 alongside the track 49. At maximum height, it rises just enough for belt 60 to clear the height of track element 49. Ramp 143 increases in height very gradually until at the cross over point, it will lift the carriage off track 49, to be transferred laterally with assistance of other diverter means described below.

Figure 13:
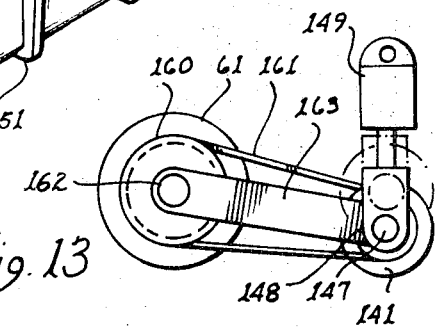
FIG. 13 is a side view showing carriage lifting means for switching to a side track.

Roller 141, and likewise roller 142, is arranged to be lowered to a lifting position as the carriage approaches the switching point. As seen in FIGS. 6 and 13, roller 141 is mounted on a stub shaft 147 journalled in an arm 148 pivoted on shaft 162 of wheel 61 or 62. A mechanism 149 is arranged to push the roller 141 down into ramp-engaging position for switching or to hold it in the raised inactive position shown in dotted lines, FIG. 13. In the full line or lowered position, roller 141 will ride onto the ramp 143 and will gradually lift the carriage until the associated wheels 61 and 62 and drive belt 60 are raised to clear the track 49. Roller 141, and roller 142 likewise, are riding the ramp 143, FIG. 8, lifting both ends of the carriage. After the carriage has been diverted onto the new route or side track, the ramp 143 gradually decreases in height to zero and the belt 60 re-engages the track rib 49 as before. A belt 161 runs on a pulley 160 fixed to the shaft 162 of a wheel 61 or 62 and drives the associated lift roller 141 or 142, thus providing positive traction while the carriage is lifted off track 49. In normal operation, the rollers 141 and 142 ride idly above the track 49.

Although roller 141 is shown in FIG. 6 as being on the left side of the carriage to engage a turn ramp 143 in the left gutter, means of obvious type may be incorporated which allow the roller 141 or 142 to be moved to the right side to engage a turning ramp in the right trough, thereby to turn the carriage off to the right.

Figure 17:
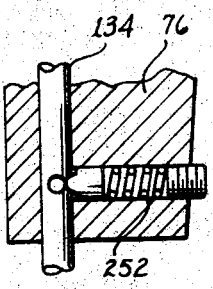
FIG. 17 is a detail view of a detent mechanism.

The carriage is stabilized laterally during travel and is held upright when stationary by sets of upper and lower stabilizer rollers 121, 123 on the right, FIG. 5, and 125, 127 on the left. These ride along against the respective side walls 12 and 13 of the guideway 10. These rollers are mounted in pairs on vertical shafts 119, 120, shown i FIG. 9. These shafts, in turn, are mounted in arms 130 and 131 which extend to right and left from hub elements 132 fastened to a vertical shaft 134. Except at and in the vicinity of switching points, these arms hold the rollers against the side walls 12 and 13 for firm, smooth, rolling contact. To facilitate removing the carriage from the track through gap 22 between the coping members 19, FIG 7, both the front and rear stabilizer units, each comprising a main shaft 134, arms 130, rollers, etc., may be turned 90° about the axis of shaft 134 by means of a special tool 167, FIG. 9, which engages a slot 168 in the top of shaft 134. A tongue 169 on the tool engages the slot 168, the tool being guided and held in place on the shaft by a sleeve 171 which it carries. Spring pressed detent means 252, shown in FIG. 17, see also FIG. 14, are mounted in member 76, to selectively engage one or the other of two recesses which are spaced 90 degrees apart around shaft 134. The detent, in each case, locks the arms 130 in transverse position, as shown in full lines, FIG. 10, for normal use, or in parallel or in-line position, as shown in dotted lines, so that the stabilizer unit can be withdrawn from the guideway when the carriage is lifted off the track.

A sleeve bearing 173 supports each shaft 134 in the member 76 between the upper and lower sets of rollers. See FIGS. 5 and 14. The tool 167 may be inserted through access openings in the floor of the carriage to lock or unlock the stabilizers in operating or in withdrawal positions, respectively. When turned to the transverse positions, the stabilizer assemblies effectively lock the carriage to the guideway, against unauthorized removal. Other elements, such as the brush or contact members 38 may likewise be folded against or into the plane of member 76 to facilitate withdrawal of the track-following mechanism from the guideway. Ordinarily, the brushes stand in resilient contact with the electric conductors 29 and the stabilizer roller assemblies 121, 123, 125 and 127 stand positioned transversely to the guideway. In similar fashion, not shown in detail, the sensor roller assembly 84, 89, 90, may be made collapsible for the same purpose. See FIG. 8 where this is shown diagrammatically.

As the carriage approaches a switching point, as in FIG. 8, a support roller 141 adjacent to roller 61 and the similar roller 142, adjacent to roller 62, are lowered into operative position by an operating mechanism 149, FIG. 13. This may consist of or comprise a solenoid. A ramp 143 will have been positioned appropriately in the guideway. Above the rollers 121, 125 on each of the shafts 119 and 120 is mounted an isolation roller 122 adapted to be engaged by the downturned flange of a diverter rail such as that shown at 139, which overhangs the isolation roller. When the carriage is in a slightly raised position, due to lowered wheel or roller 141 (and 142) engaging a ramp 143, the carriage is lifted to a position such that the isolation roller 122 shown on the upper left, FIG. 9, will engage the diverter 139 and pull the carriage off to the left. The wheels 61 and 62 and belt 60 will have been lifted just above track rib 49, while wheels 141 and 142 support the weight of the carriage on the ramp 143. Thus, the carriage leaves the straight track, FIG. 8, and takes the side track to the left.

Figure 9:
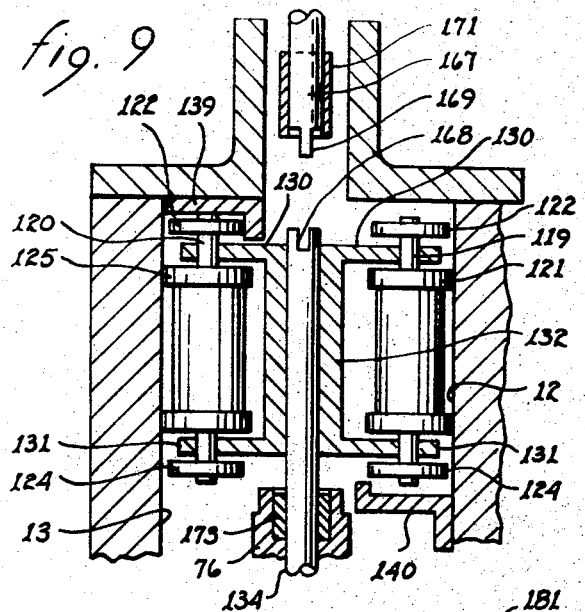
FIG. 9 is an enlarged detail view, partly in section, showing lateral rollers and their mounting for holding the carriage upright in the guideway.
Figure 10:
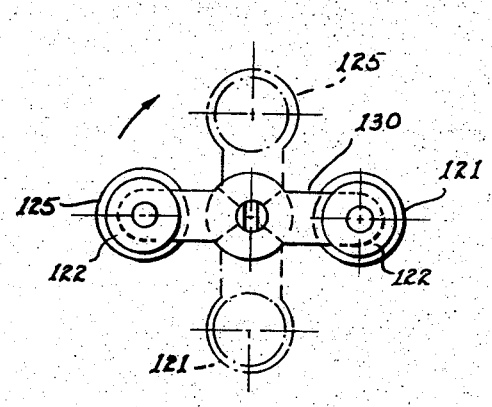
FIG 10 is a top view of the parts shown in FIG 9, showing also certain of these parts in a changed position.

On the right, FIG. 9, another isolation roller 124 is mounted on the lower end of shaft 119, a similar roller being on the lower end of shaft 120. When the carriage is not raised off the track 49, because either there is no ramp 143 present, or the wheels 141 and 142 have not been lowered into operating position, the appropriate roller 124 will be engaged by the upturned flange of a retainer bar member 140. Thus, for normal straight travel, keeping to the right as shown in FIG. 8, an isolation roller 124 will engage a retainer bar 140 and keep the carriage on the track 49. When a ramp 143 is in place and the lifting wheels 141 and 142 are moved to carriage-supporting position, the carriage is raised off th main line and diverted to the side track or new route.

The isolation rollers 122 and 124 are preferably in the form of simple ball or roller bearing assemblies, having their inner races fitted to shafts 119 or 120 and arranged for the outer race to contact a diverter bar 139 or a retainer bar 140.

Means for control of the lifting wheels or rollers 141 and 142 may be mounted on the carriage if desired. In such case, these may be controlled by persons on or in the carriage. Alternatively, the activator may be mounted in the guideway, to energize the lifting wheel controls when the carriage comes along. Thus, the lifter roller lowering mechanism 149 may be operated manually or automatically to cause the carriage to follow a predetermined course, assuming that ramps 143 have been set in the track at appropriate locations. For multiple unit operation, e.g., for personal transport on a large scale, it may be preferable to have all switching control functions located at a central station and out of the hands of passengers in the carriage.

The stabilizing rollers 121, 125, etc., are mounted in sets near the front and rear of the carriage for maximum lateral stability. As described above, they are secured directly or indirectly to the rigid vertical frame plate 76. The ends of this plate are thus approximately centered in the guideway at all times but its middle part may closely approach one side wall 12, or the other, 13, on curves. When this happens, the sensor rollers 89, 90, which give steering direction to the wheels 61, 62, and also to the traction belt 60, perform their proper function to give smooth lateral guidance at all times.

Additional diverter and retainer rails, similar to those outlined in the above description pertaining to isolation rollers 122 and 124 and to the stabilizer rollers 121, 125, etc., FIG. 9, are applied to the sensor rollers 89, 90. The purpose of this is to keep the sensor rollers properly oriented, e.g., to keep rollers 90 in proper position when a side wall such as 13 of the guideway, recedes at a switching point.

Figure 12:
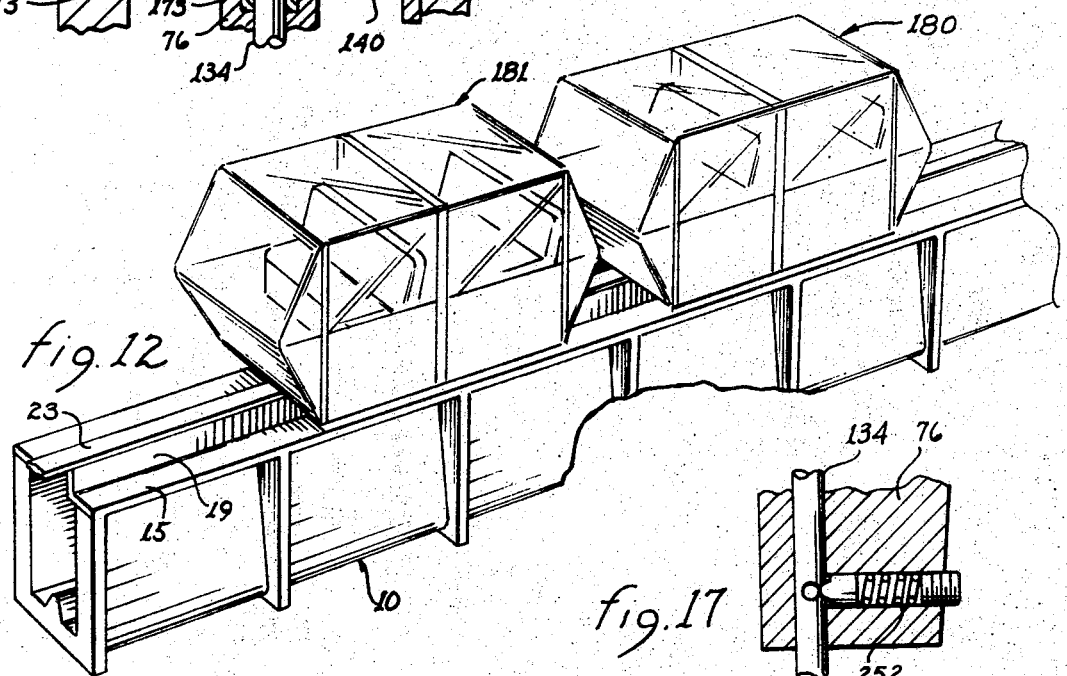
FIG. 12 is a schematic showing of multiple carriages on a track as modified for transportation on a larger scale than in FIGS. 1 and 2.

FIG. 12 shows carriage arrangements for handling denser traffic and FIG. 15 shows means for supplying carriages with conditioned air, either heated for winter or cooled for summer, or both. As shown in FIG. 15, air conditioning plants 152 and 155 (heating and/or cooling) are positioned at suitable intervals between the ingoing and outgoing runs of the guideways. Assuming that travel is to the south, as shown by the arrow 170 in the left guideway 151, conditioned air is supplied from plant 152 through line 154 to flow both ways in line 150. This provides hot or cool air for the upper or north part of the system. A second plant between line 157, connected to guideway 150, and line 156 connected to guideway 151, supplies heating or cooling to carriages in the lower or south part of the system. An air scoop, 301, FIG. 14, conducts air through the flap opening, the flap having been plowed open by front member 304 of the carriage assembly. The means by which conditioned air is taken from the conduit or guideway through a "scoop" or duct work 190, 191, is shown diagrammatically in FIG. 14. The inlet duct 190 extends down into the guideway, the flaps or cover member being plowed out of the way by member 304 on the front of the carriage. Inflow may be controlled by leakage or controlled outflow of air from the carriage by means not shown but of obvious type.

Preferably all lines of the guideway are unidirectional to prevent head-on collisions between carriages. Depending on traffic density, block systems may be installed to prevent carriages running too closely together, as will be obvious. Carriages may be connected in multiple units, as shown at 180, 181, FIG. 12, where the guideway construction is much the same as in FIG. 7. Control may be exclusively at the computer or other central station, or partly or wholly in the carriage, but it is preferred, in general, to keep the carriages free from control means, as far as possible. The cost of individual carriages is thus minimized and optimum use of power is achieved. FIG. 14 also shows diagrammatically an auto transformer 194 with taps 195, 196, 197 to various conductors 198, 199, 200 to be supplied with various voltages.

As mentioned above, the system has particular application to golf courses where there is need to replace the conventional golf carts and eliminate their damage to the grounds as well as their other objectionable features. With obvious modifications it can be adapted to ski-lifts, for use in parks, other amusement areas, shopping centers, etc. FIG. 16 shows a part of a golf course having first, second, third and fourth greens 201, 203, 205 and 207. A headquarters station 210 is established near the first green 201 at the club house, for example, where there are a number of side tracks 212 for storage of a number of carriages 215, 216, 217, etc. Play may be made at the first hole, for example, before the first carriage is used or the first carriage may be sent automatically, or under control of a player/spectator or an attendant to point 220 to await the play of the first one, two or four players. They get into the carriage and travel to the next green, or the players may walk and the spectators may ride, to it, where their carriage is diverted to point 221 on siding 222. While they play the hole, to prevent back-tracking and to make room for those who follow, an automatic tee positioner (ATP) may be activated, to move the carriage automatically to point 223, at the opposite end of the siding, where the carriage will stop automatically and await its riders for transporting them to the next green. It stops next at point 225 on siding 226. From this stop, the carriage may be sent on under automatic control to position 227, to await its riders. At each of the sidings just described, the carriages are off the main line, permitting other riders to go on past without interruption. After play is completed at green 205, the riders continue on to green 207 where they may disembark at point 228. The same procedure may be repeated here, or the carriage may be sent on to the home station or to some other point where the riders may be picked up later. These controls may be effected through conductors 198, 199, 200, FIG. 14, or through others, not shown, e.g., from transformer 194. Also, the carriage is under manual control when occupied so that it can be stopped at any point between those designated above.

The carriage 300 shown in FIG. 14 is enclosed with front windshield 240, doors 242, 244, seats 246, 248, control pedal 249, brake 250, and other conventional parts, most of which have been described in connection with the other figures. The framing of the carriage, aside from parts already described, may be varied according to its capacity, need for weather protections, etc., as will be obvious. FIG. 15 shows carriage 300 on track section 150.

The automatic switching devices, which form no part of the present invention, so far as their details are concerned, may be operated under control of a central station through electric lines such as 199, 200, or others, supplied by appropriate means such as taps off transformers, and under control of a computer or other master computer, not shown. The particular means by which switching, starting, automatic tee positioning, speed limit control, etc., are accomplished automatically from a control station forming no part of the present invention, other than to the extent they are combined into the system claimed below.

It will be obvious that modifications, variations, and substitutions may be made in the various parts and combinations without departing from the spirit or limiting the scope of the invention. It is intended by the claims which follow to cover the invention and its obvious modifications as broadly as the state of the art properly permits.

What is claimed is:

1. A personal transportation system of the character described, which comprises, in combination, a guideway of upright channel cross section substantially set into the ground and having spaced upright sidewalls and a carriage supporting rib or monorail at the bottom of the channel, a frame including an upright support for a carriage, a carriage mounted on said upright support, a front support wheel and a rear support wheel mounted in said upright support, each of said wheels being grooved in its outer periphery, a heavy elastic traction belt passing around said wheels in the grooves thereof to support said wheels on said supporting rib or monorail, side rollers mounted in said upright support for contacting the channel side walls and giving lateral support to said carriage through said upright support, an electric supply line in said guideway, a motor mounted in said frame to drive said traction belt, and means for bringing power from said electric line to said motor.

2. A system according to claim 1 in which the carriage includes means for controlling the power from said line to said motor.

3. A system according to claim 1 in which the carriage support includes a main middle support section and front and rear wheel carriers pivoted to said main section so they can be steered, separate wheels being mounted respectively in said carriers and means under control of the horizontal profile of said side walls for steering said wheels.

4. A system according to claim 1 which includes a pair of side wall contactors mounted on a pivoted structure, said pivoted structure being supported in said upright support, and means for moving the front and rear wheel carriers in response to contact between said contactors and said side walls.

5. A system according to claim 1 which includes switching means in said guideway to selectively move the carriage onto a side track or to continue it on an original guideway line.

6. A system according to claim 1 in which the guideway consists of monolithic sections of concrete joined together in smooth joints.

7. A system according to claim 6 in which switching sections in the conduit are provided for selectively leading the carriage into alternative guideways.

8. A system according to claim 1 in which the guideway includes extra electric conduits, means for supplying power to said conduits, and means outside the carriage for varying the power so supplied to control operations of said carriage.

9. A system according to claim 8 in which a movable switching ramp is set in the guideway bottom and a diverter rail is mounted in the guideway, and wherein the carriage includes means for selective engagement or non-engagement with said diverter rail.

10. A system according to claim 1 wherein the track is partially closed at its top by cove means to reduce the width of the space between said side walls at the top of the channel.

11. A system according to claim 10 which includes a flexible elastic cover flap connected to at least one of said cove means and normally overlying closely and covering the channel to exclude moisture and other foreign matter.

12. A system according to claim 10 which includes a flexible closure for the channel to exclude foreign matter from the channel, thereby forming of the channel a closed conduit, and means for supplying conditioned air to said channel to temper the air in the carriage.

13. A system according to claim 1 which includes a flexible cover for the channel, means on the carriage for opening said cover as the carriage passes over it, and means for supplying artificially conditioned air to the carriage through said opening in the cover.

14. A system according to claim 1 which includes a complete circuit of said guideway, a station alongside said guideway, and a plurality of sidings at said station for storing plural carriages at said station.

15. A system according to claim 1 in which the front and rear support wheels are mounted in pivoted forked carriers each secured to the upright support, wherein sidewall contacting rollers are pivotally mounted in said upright support, movable means mounted in said upright support adapted to be changed in position by said contacting rollers when there is a change in the curvature of the guideway, and means connecting said movable means to said pivoted forked carriers to impart a steering movement to said wheels and to the belt between said wheels and the track rib in response to said curvature, whereby curvature in said guideway is programmed into the direction of movement of said belt along said rib.

16. A system according to claim 15 in which the support wheels and said belt are driven through a pulley which supports said belt and wherein an additional belt on the same pulley inside the first mentioned belt is connected to the drive motor.

17. A system according to claim 1, which includes a track having first and second stop positions, and automatic means on the carriage for moving said carriage from said first to said second stop position, including means for automatically stopping the carriage in the second stop position.

18. A system according to claim 1 which includes a removable switching ramp insertable in the guideway beside said rib or monorail, and a shiftable lifting roller mounted on the carriage, and means for selectively setting said roller in a lift position to shift the carriage weight onto said switching ramp or to have the roller in inoperative position for non-engagement with said ramp.

19. A system according to claim 18 which includes an isolation roller on either side of said carriage frame, a diverter rail on each side of the guideway at a switching point, and means for selectively engaging one of said isolation rollers with the diverter rail on its side, to select the path of travel at said switching point.

* * * * *